United States Patent [19]

Orb

[11] Patent Number: 4,773,336
[45] Date of Patent: Sep. 27, 1988

[54] RAILROAD BOGIE FOR REMOVABLY SUPPORTING COUPLED SEMI-TRAILERS

[75] Inventor: Robert M. Orb, Sundbury-on-Thames, England

[73] Assignee: Trailer Train Limited, Great Britain

[21] Appl. No.: 873,676

[22] Filed: Jun. 12, 1986

Related U.S. Application Data

[63] Continuation of Ser. No. 673,583, Nov. 21, 1984, abandoned.

[30] Foreign Application Priority Data

Nov. 23, 1983 [GB] United Kingdom ................. 8331290
Feb. 14, 1984 [GB] United Kingdom ................. 8403992

[51] Int. Cl.$^4$ ........................ B61F 5/16; B61D 3/20; B61G 5/02
[52] U.S. Cl. ................................. 105/199.4; 105/4.2; 105/159; 410/53; 280/438 A
[58] Field of Search ................. 105/34 R, 4 A, 199 R, 105/199 S, 199 C, 157 R, 158 R, 159, 182 R, 189, 200, 4.1, 4.2, 157.1, 158.1, 182.1, 199.1, 199.5, 199.4; 410/53; 280/433, 438 A

[56] References Cited

U.S. PATENT DOCUMENTS

| 3,675,592 | 7/1972 | Bateson et al. | 105/4 R |
| 4,397,243 | 8/1983 | Hickman | 105/159 |
| 4,574,707 | 3/1986 | Hickman | 410/53 |

FOREIGN PATENT DOCUMENTS

| 0961714 | 9/1956 | Fed. Rep. of Germany | 410/53 |
| 0157610 | 12/1981 | Japan | 105/159 |
| 0156973 | 6/1978 | Netherlands | 105/4 R |

Primary Examiner—Robert B. Reeves
Assistant Examiner—Scott H. Werny
Attorney, Agent, or Firm—Wood, Herron & Evans

[57] ABSTRACT

A road/rail transport system is described and comprises rail bogies of the kind having two axles and a central bogie bolster arranged between the axles and transverse to the intended direction of travel and semi-trailers which are preferably of the kind having road wheels at the trailing ends and adapted for connection at their leading ends to a tractor unit. The rail bogie bolster has a pocket in which a mounting member is held, the pocket and mounting member having part spherical surfaces in engagement to permit limited movement of the mounting member relative to the pocket. The mounting member is adapted for releasable attachment to the frame of a semi-trailer which at one end is provided with an aperture for receiving the attachment of the mounting member and which at the other end is connectable to a similar semi-trailer so that a train may be constructed of semi-trailers and bogies with each bogie effectively supporting the weight of one semi-trailer. The semi-trailers can readily be converted to a road mode.

17 Claims, 8 Drawing Sheets

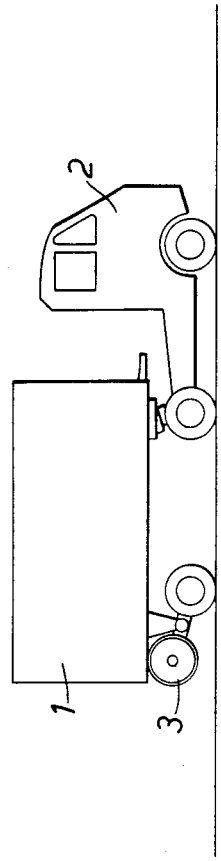
Fig.1.a PRIOR ART
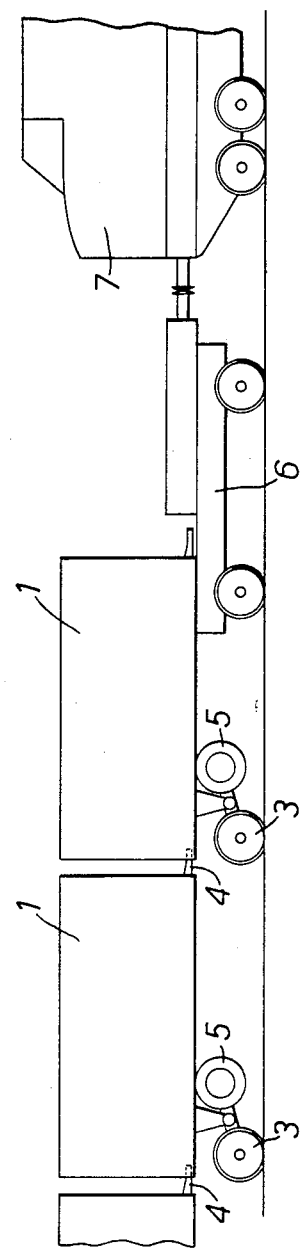
Fig.1.b PRIOR ART

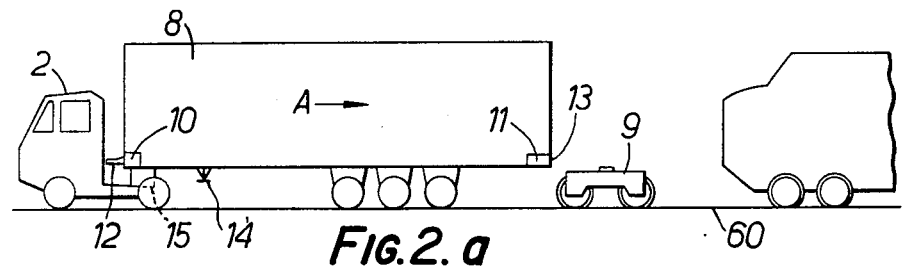
FIG.2.a
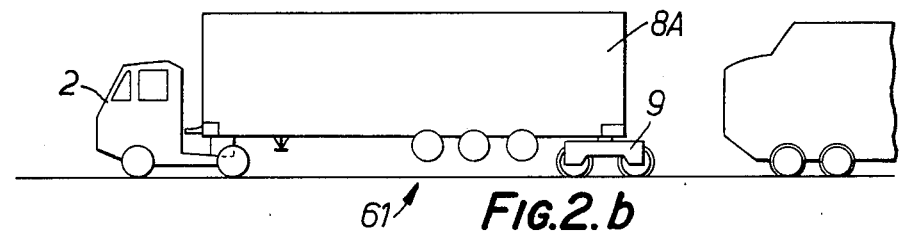
FIG.2.b
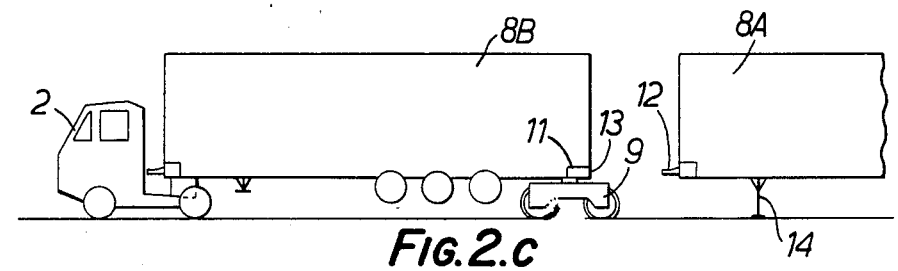
FIG.2.c
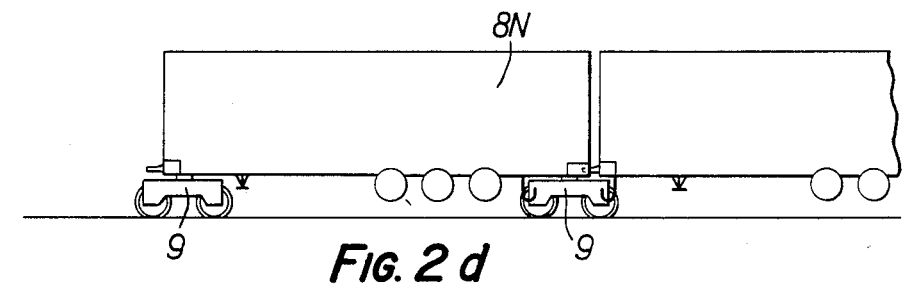
FIG.2 d

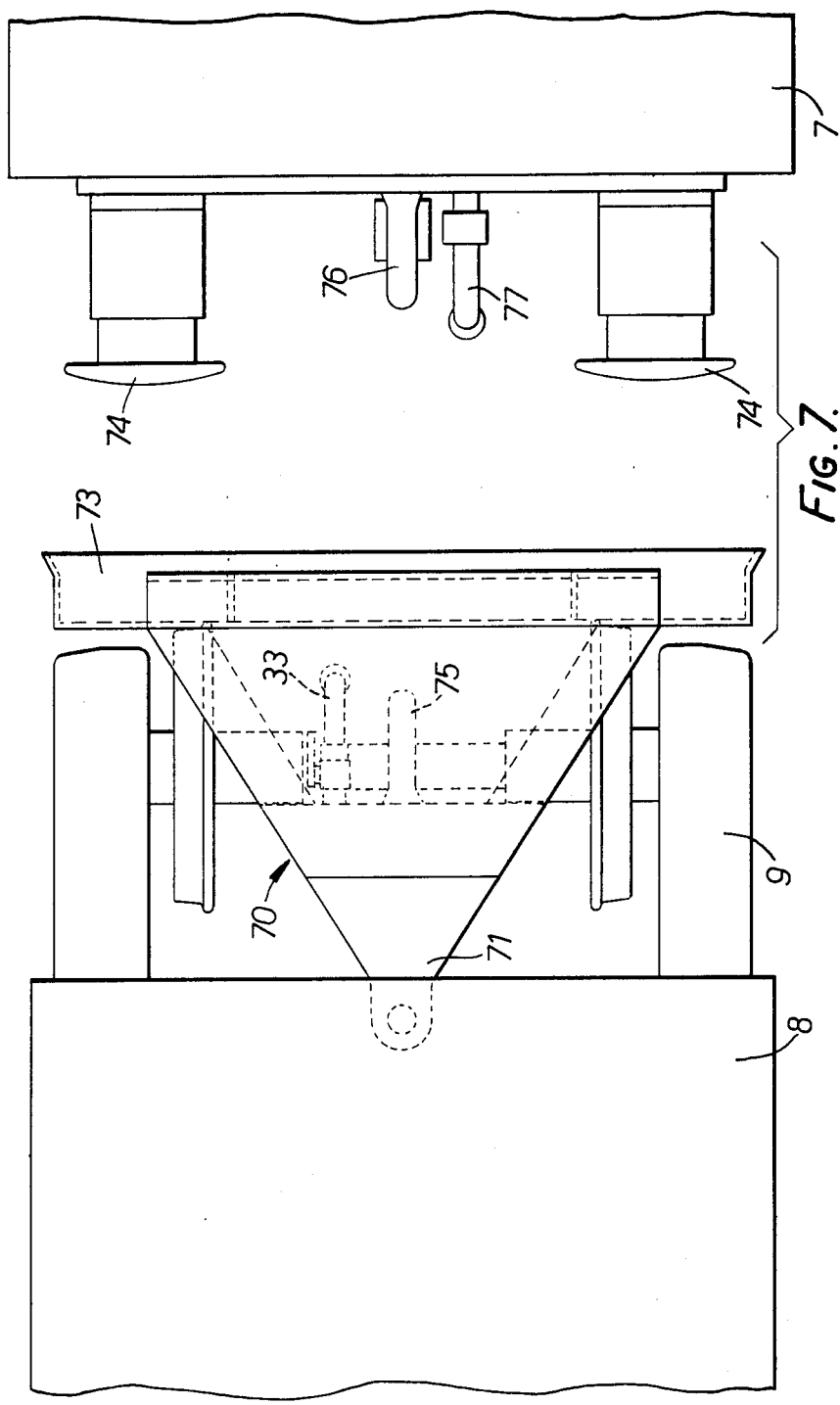

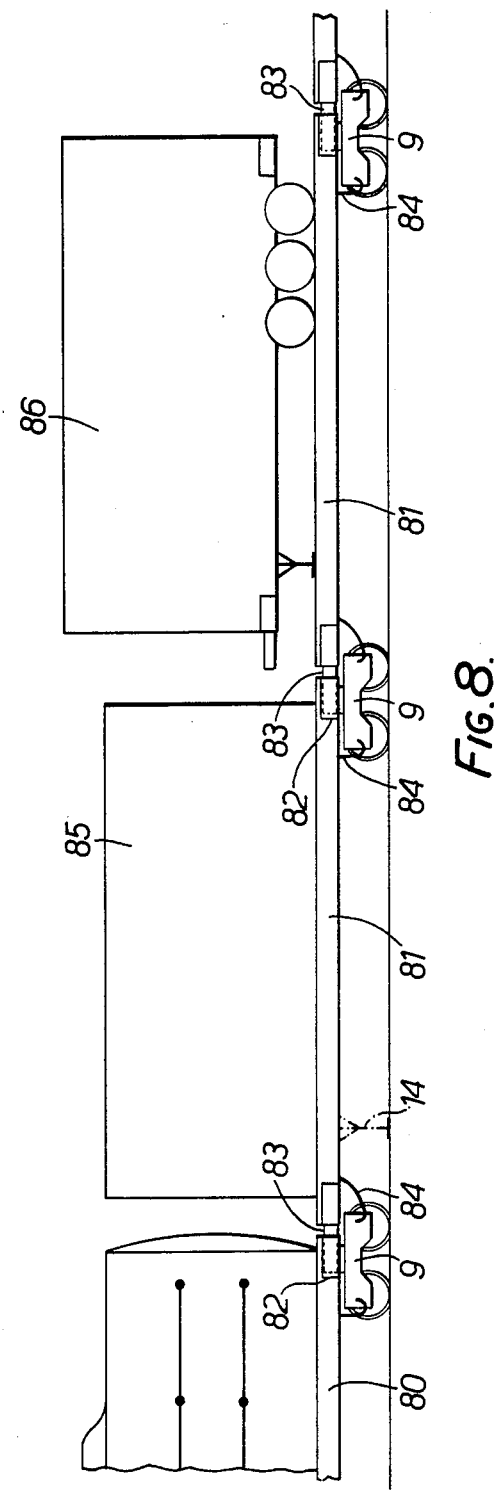

RAILROAD BOGIE FOR REMOVABLY SUPPORTING COUPLED SEMI-TRAILERS

This is a continuation of application Ser. No. 673,583, filed Nov. 21, 1984, now abandoned.

FIELD OF THE INVENTION

This invention relates to a transport system and is particularly concerned with a rail bogie which is so devised as to make possible a novel and economical road/rail transport system, using semi-trailers (as hereinafter defined) adapted for use with the rail bogie.

The term "semi-trailer" is usually intended to denote any vehicle having road wheels at its trailing end and adapted for connection at its leading end to a tractor unit. Such a vehicle will hereinafter be referred to as a "road semi-trailer" and may be in the form of a flat bed truck, a container box, a tank or even a passenger carriage. However, the term "semi-trailer" is additionally used herein to denote a carrying unit devoid of road wheels and devised for a purely rail mode of operation. Such a unit will be hereinafter referred to as a "rail semi-trailer" and may be in the form of a flat bed unit adapted or intended to carry containers or road semi-trailers which can be loaded and unloaded by cranes, derricks or other lifting means at a depot, or may be in the form of a container box, a tank or other rail unit.

DESCRIPTION OF THE PRIOR ART

For economic, commercial and environmental reasons, there is a growing need for maximum flexibility of freight transport as between road and rail. Various solutions have been proposed, involving the re-design of road trailers for optional rail travel.

One such design involves the provision of a retractable single axle rail suspension system at the rear of a road semi-trailer.

The resulting dual purpose vehicle is thus fitted with complete sets of wheels, suspension and brake equipment for both road and rail use. In the road mode the road semi-trailer operates in the normal way with the redundant rail axle set raised clear of the road. In the rail mode the vehicles are assembled into a train by inserting a tongue on one trailer leading edge into a socket on the trailing edge of an adjacent trailer. In this mode the road wheels are raised and the rail wheels lowered into contact with rails.

Such a design gives rise to a number of disadvantages:

1. In the road mode the redundant solid steel rail wheels and axle have to be carried by the trailer, thus reducing its payload.
2. In the rail mode the vehicles are inherently more stable going forwards with trailing rail wheelsets, than in reverse with leading wheelsets. The inability of a train of such vehicles to travel backwards at maximum operating speed is restrictive of the rail operation.
3. The single rail axle per vehicle places restrictions on the payload of the vehicle on the rail. Thus at the maximum speed of 75 mph envisaged for rail operation, the maximum permitted rail axle load is 20 tonne, (20.5 B.R. 20 UIC), while the G.L.W. (gross laden weight) of a new 38 tonne G.L.W. road vehicle semi-trailer is 31 tonne.
4. The combination of road and rail vehicle technology in a single vehicle would result in a high initial unit cost, and difficulties with maintenance. Thus the need for lengthy and extensive rail safety evaluation is obviated the closer a new design comes to tried and tested rail equipment. Furthermore, the risk of damage to a redundant rail axle assembly on such a vehicle during road use will give rise to a requirement for additional maintenance and safety checks prior to use of the vehicle in a train.

BRIEF DESCRIPTION OF THE INVENTION

According to one aspect of the present invention there is provided a rail bogie of the kind having two axles and a central bogie bolster arranged between the axles and transverse to the intended direction of travel of the bogie, wherein the bolster has a pocket and a mounting member held in the pocket, the pocket and mounting member having complementary surfaces, preferably part spherical surfaces in engagement so as to permit limited movement of the mounting member relative to the pocket, the mounting member being provided with attachment means whereby it may be releasably secured to the frame of a transporter body The complementary surfaces which are in engagement are preferably spherical or part spherical but the invention is also applicable to the use of disc-shaped mounting members such as are used in some rail technologies.

Preferably the bogie also comprises brake means adapted to be serially interconnected with the brake means of adjacent similar bogies when arranged to form a train of bogies and transporter bodies and operable through control means on a locomotive arranged to drive said train.

In this arrangement, the brake means, that is to say the brake discs or blocks for engaging the bogie wheels, the mechanical means for moving the discs or blocks into engagement with the wheels and the control equipment are all mounted on the bogie, and the transporter bodies merely comprise means for serially connecting one brake means with another. Thus, for example, in the case where a pneumatic braking system is employed, all the brake means are mounted on the bogies and each transporter body will have merely a hollow pipe with hose couplings at each end for connection to complementary couplings on the bogies and to a pneumatic source on a locomotive.

The provision of the rail bogie in accordance with the invention makes it possible to provide in accordance with another aspect of the invention a semi-trailer adapted for use with the present rail bogie, wherein the semi-trailer is provided at one end with means for receiving said attachment means whereby the semi-trailer may be releasably attached at one end to a respective bogie and with means at each end whereby one semi-trailer may be pivotably connected to an adjacent similar semi-trailer, the arrangement being such that, when the connecting means is so coupled, the load of a first semi-trailer is transmitted to the bogie of a second similar semi-trailer via the connecting means and the mounting of the second semi-trailer on the bogie.

As indicated above, the semi-trailer may be a road semi-trailer or a rail semi-trailer. It is thus possible to provide in accordance with a further aspect of the invention a rail train comprising a plurality of such semi-trailers interconnected by the connecting means and each semi-trailer being releasably mounted on a rail bogie, whereby, with the exception of the first and last semi-trailers the weight of one semi-trailer is effectively supported by one bogie.

The train may be formed at a rail terminal or depot by mounting road semi-trailers on bogies which can be stored safe from damage at the rail terminal or depot. At the end of their journey, the road semi-trailers are demounted from the bogies and driven away by tractor units, while the bogies are used to form a fresh rail train with waiting semi-trailers or stored at the terminal or depot for subsequent reuse. Since the road semi-trailers used to form such a train do not carry the rail wheels and axle assembly, which are instead provided on the bogies, it is thus clear that the road and rail vehicle technologies are kept largely separate as between the semi-trailer and the rail bogie, to minimise production costs and satisfactorily divide the repair and maintenance requirements between the road and rail engineers.

As compared with a conventional rail vehicle for freight transport, the bogie will have lower production costs and, in view of its much smaller size, require much less space for a repair workshops at the rail terminal.

In the preferably spherical pivot assembly of a conventional rail bogie and transporter body combination, a hemispherical bearing block is permanently attached to the transporter body. However, in the practice of the present invention, out of use bogies at the rail terminal are protected from damage to the lining of the part spherical pocket by the presence of the part spherical mounting member or bearing block seated therein, while the semi-trailer during road use is not encumbered by the additional weight of such a block. This is of particular importance because not only is the lining of the pocket protected from physical damage but it is also protected from the effects of weather. Furthermore, each mounting member will, during use, bed down into its own part spherical pocket to provided a better transfer of the load of the semi-trailer to the rail wheels of the bogie.

The semi-trailer will preferably carry at its rear end, a box or body bolster including the means for receiving the bogie attachment means and the adjacent semi-trailer connecting means, which bolster may additionally carry the rear lighting equipment, number plate etc., for the road use of the semi-trailer. A similar such box may also be provided at the front end of the semi-trailer, so that the last semi-trailer of a train may be mounted on a bogie by its front end.

However, since this will serve to reduce the payload of the road semi-trailer it may be preferred to provide an adaptor bogie for connecting the first semi-trailer of a train to the engine.

The connecting means for coupling together adjacent units preferably comprise a tongue projecting from the front of one trailer for mating engagement with a socket or slot provided in the rear of the adjacent trailer, the tongue transmitting the load of the first said trailer to the adjacent bogie via the mounting of the adjacent trailer, such as, the attachment means of the mounting and bearing block. Each tongue is formed with an aperture to receive a vertical pin which is mounted to be moved vertically up and down in the slot of the adjacent trailer, the tongue engaging about the pin by means of a member formed with an interior cylindrical surface to receive the pin and an exterior spherical surface movably received in the tongue, whereby the tongue has limited pivotal movement relative to the pin. Ideally the axis of the vertical pin would coincide with the vertical axis of the mounting member in the bogie and its attachment means, but in general it is not possible to achieve this in practice and the two axes are spaced apart from one another a short distance in the direction of travel. Because the coupling of adjacent semi-trailers to one another and the attachment of the semi-trailers to the bogies take place on the same centers, there is a considerable reduction in "overthrow" as the trailer goes round a bend, that is to say a reduction in the amount by which the end of a rail carriage and its buffers project to one side of the track as the carriage goes round a bend. This reduction in overthrow correspondingly reduces the diagonal racking loads experienced on negotiating a bend so that the structure of the semi-trailer can be lighter than that of conventional rail cars. Furthermore, this type of coupling eliminates slack action and considerably reduces the longitudinal impact forces experienced on starting a train into motion. In view of this tongue and socket type of coupling which takes the buff and draught loads of the train, the presence of buffers as present in conventional goods wagons is unnecessary and the semi-trailers can be connected closer to each other than conventional goods wagons.

Since each trailer in a train will be supported at its rear end directly through its mounting on a bogie, and at its front end via the connecting means (such as a tongue) by the bogie of the adjacent unit, each bogie (other than the two end bogies) of the train effectively bears the load of a single trailer.

The trailer may be, as indicated above, of a largely conventional design; thus, it may carry the usual landing legs near its front end, and the fifth wheel pin for its use as a road vehicle. When mounted on the bogie, the road wheels must be raised out of ground contact, and this may be achieved either through sufficient height of the bogie or by use of the trailer's wheel suspension system.

Preferably, this is achieved by use of the trailer's wheel suspension system as this enables the bogie to be placed beneath a standard trailer under-frame and the trailer to be lowered on to the bogie. This has the advantages that not only does it make it easier to place the semi-trailers in relation to the bogies for assembly, but means that the semi-trailer is positioned at a lower height in the rail mode than in the road mode. This enables the trailers to be aligned with their tongue and socket couplings at substantially the same height as conventional rail coupling heights, thereby reducing turning forces at the coupling of the train to a locomotive. Furthermore, if the semi-trailer is in the form of a box container, then the lowering of the container from the road mode to the rail mode, means that the resulting train is more able to meet the rail loading gauge. Thus, for example, the present bogie is preferably chosen to be of dimensions such that when a road semi-trailer of standard I.S.O. container dimensions is connected to the bogie in a train, then the train will pass the British Rail Freightliner gauge.

A particular advantage of a train composed of the present bogies and semi-trailers is that the train is capable of travelling both forwards and backwards at the maximum operating speed due to the use of centrally pivoted rail bogies and the fact that weight on each bogie is supported between the axles of the bogie.

If desired a coupling member may be provided to enable a locomotive to be attached to the rear of a train. The coupling member may be carried by the locomotive but is preferably mounted on the last semi-trailer of the train so as to be readily available for use should it be required. The coupling member is generally triangular in plan view with a tongue at its apex for connection to the slot or socket of the last semi-trailer and with cups at its other end to receive the buffers of the locomotive. A conventional hook coupling is carried by the coupling member for engagement by a coupling link on the locomotive.

Furthermore, the maximum permitted load for a two-axle bogie is sufficient to accommodate the new 38 tonne G.L.W. road semi-trailers.

It is to be understood that the terms "front end" and "rear end" or "loading edge" and "trailing edge" used in relation to the trailer relate to those ends when the trailer is used on the road; when part of a train, the trailer may be propelled in either direction.

THE DRAWINGS

In order more clearly to describe the invention, reference will now be made to the accompanying drawings, in which:

FIGS. 1(a) and (b) show prior art dual purpose road and rail vehicle, in the road and rail modes respectively;

FIGS. 2(a) to (d) show the assembly of rail transport units of the invention to form a train;

FIG. 7 is a plan view of a reverse running coupling member, and,

FIG. 8 is a view of a number of rail semi-trailers assembled to form a train.

DESCRIPTION CF THE DRAWINGS

Figure 3:
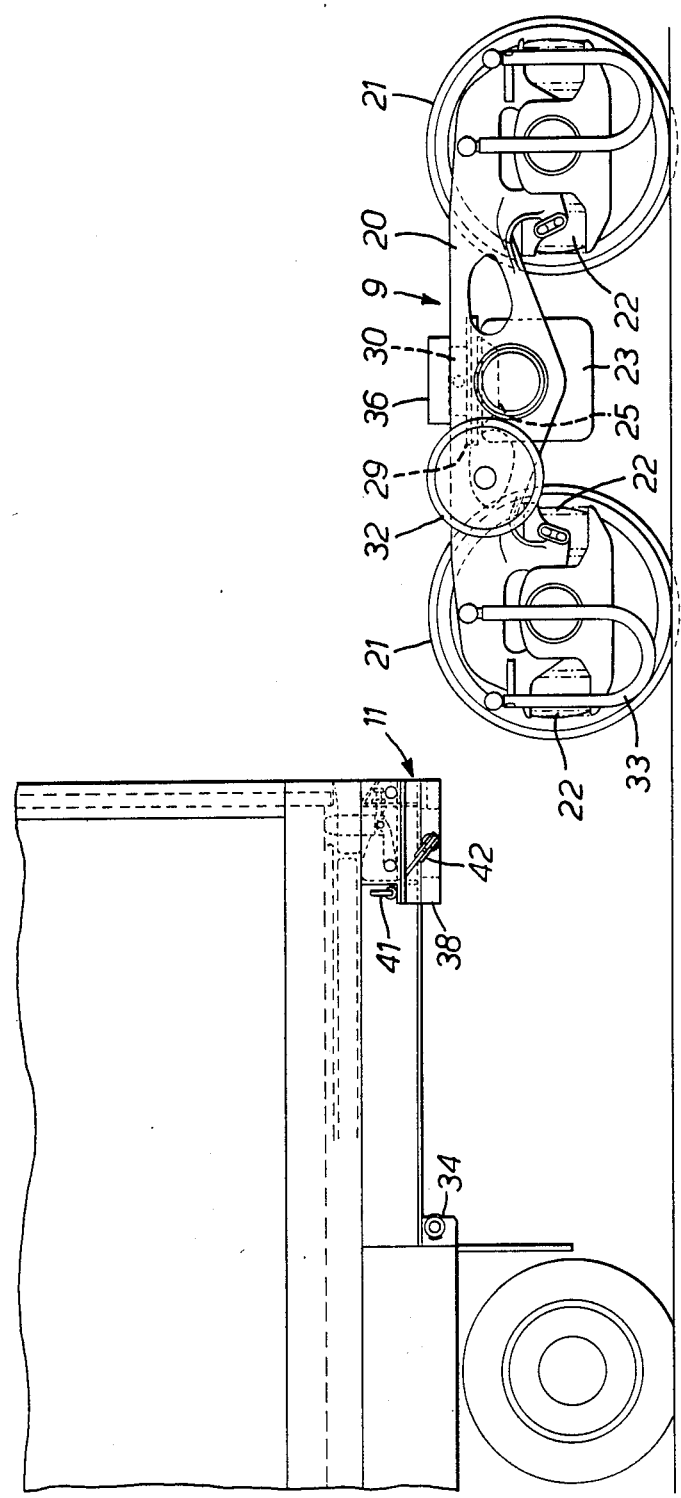
FIG. 3 shows in side view a rail bogie in accordance with the invention and the rear end of a road semi-trailer which is to be attached to the bogie.

FIG. 1 illustrates the dual purpose prior art vehicle referred to earlier. At (a) the vehicle 1 is shown in the road mode, coupled to a tractor unit 2 and with the rail axle set 3 raised clear of the road. At (b) is shown a train of vehicles 1 coupled together through tonque and socket connectors 4. The rail axle sets 3 are lowered and the road wheels 5 raised, the front vehicle of the train being supported at its leading edge by an adaptor vehicle 6. This adaptor vehicle 6 also connects the train to a locomotive 7.

FIG. 2(a) shows a semi-trailer 8 of the invention about to be assembled to a rail bogie 9, also of the invention. The semi-trailer 8, coupled to a tractor unit 2 in the road mode looks like a conventional road semi-trailer. The frame and body construction, however, must be capable of withstanding the buff and draught loads when forming part of a multiunit train, the units of which will be connected using slack free couplers. The front and rear of the frame terminate in transverse box sections or body bolsters 10, 11. The front body bolster 10 has a coupling tongue 12 projecting from it, while the rear body bolster 11 has a complementary socket 13. A train brake pipe (not shown) is concealed in the frame and terminates at either end with snap connectors (also not shown). The semi-trailer has the conventional landing legs 14 and fifth wheel pin 15 near its front end.

Figure 4:
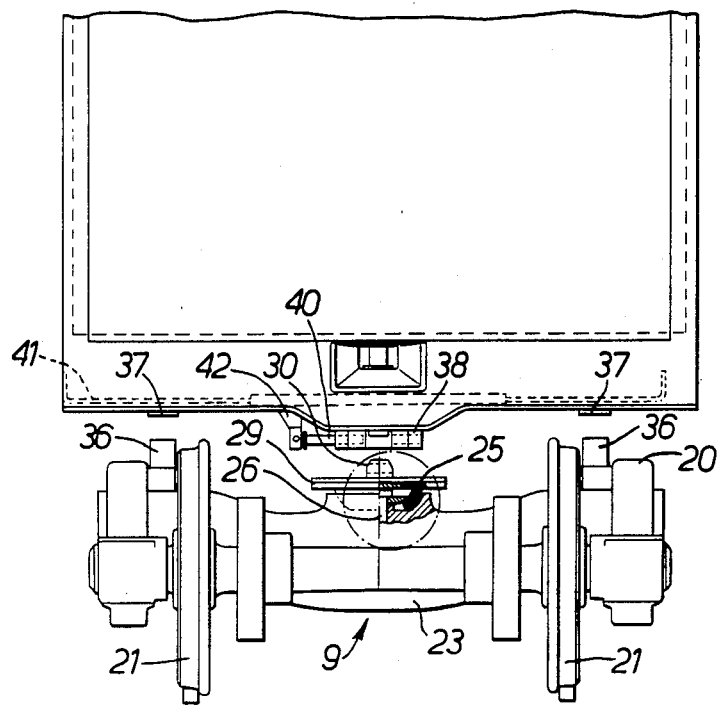
FIG. 4 is an end view of the bogie and semi-trailer shown in FIG. 3.
Figure 5:
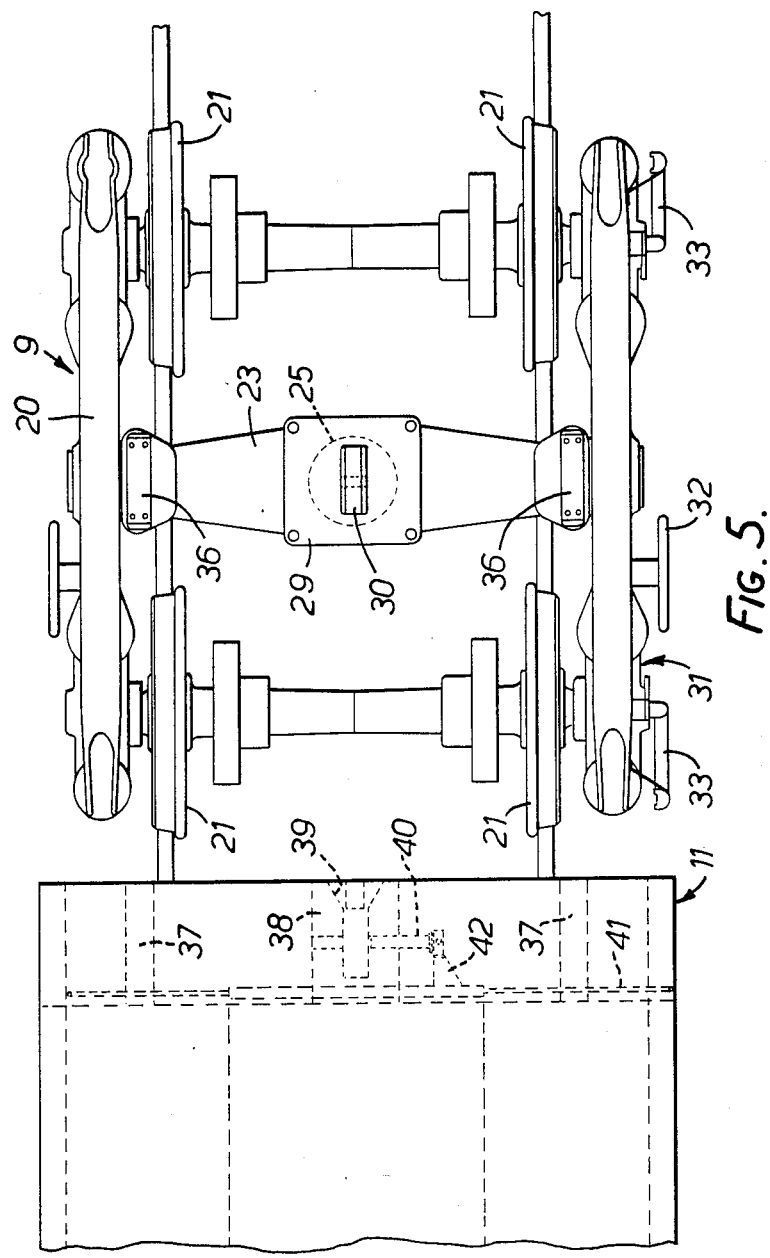
FIG. 5 is a plan view of the bogie and semi-trailer shown in FIGS. 3 and 4.

The rail bogie 9, shown in more detail in FIGS. 3 to 5 has a substantially conventional H-frame 20 and two pairs of rail wheels 21 on which the frame 20 is mounted by conventional suspension means 22 which has conventional multi-stage springs designed to cope with variable loads and which need not be described in greater detail. The H-frame 20 has a transverse box section or bogie bolster 23, the upper surface of which is formed with a part spherical pocket 24 in which a mating part spherical mounting member 25 is held so as to be universally rockable about a mounting pin 26 with the aid of a mounting disc 27 (see FIG. 4). A liner of bearing material 28 is conveniently provided between the pocket 24 and the mounting member 25.

The mounting member is covered by a plate 29 which carries an apertured connecting block 30 for connecting the bogie to the rear end of the semi-trailer 8.

The bogie also has a conventional load proportional type of braking system 31 which may be in the form of disc brakes or brake shoes as well as a hand brake 32. Since such a braking system is conventional it need not be described in greater detail. The bogie 9 has flexible air brake hoses 33 fitted at each end (FIGS. 3 and 5) and these hoses connect into snap connectors 34 at the ends of a rail brake pipe fitted to each of the semi-trailers 8 as shown in FIGS. 2(d) and 3.

The rail bogie, in conventional manner is also provided with permanent contact, spring side bearers 36 in the form of spring-loaded pads with built in roll stops which are positioned on the bogie bolster 23 on each side of the mounting and which engage corresponding rubbing stops 37 on the underside of the body bolster 11 at the rear end of the semi-trailer 8. The side bearers 36 serve in conventional manner to control body roll and bogie rotation.

The body bolster 11 is effectively a hollow box extending across the rear end of the semi-trailer. A U-shaped shoe 3S is mounted below the bolster 11 and has a splayed mouth 39. A retaining pin 40 passes horizontally through the shoe 38 and the arrangement is such that as a bogie is moved into position below a semi-trailer, the connecting block 30 will enter the mouth 39 of the shoe and be guided by the mouth until it occupies a position where the retaining pin 40 can be passed through the shoe and the aperture in the connecting block to connect the semi-trailer to the bogie 9. A bar 41 with cranked ends carries a bracket 42 on which the retaining pin 40 is mounted, the bar extending for the full width of the body bolster 11 and being so arranged that the retaining pin can be engaged or disengaged from the side of the semi-trailer.

Figure 6:
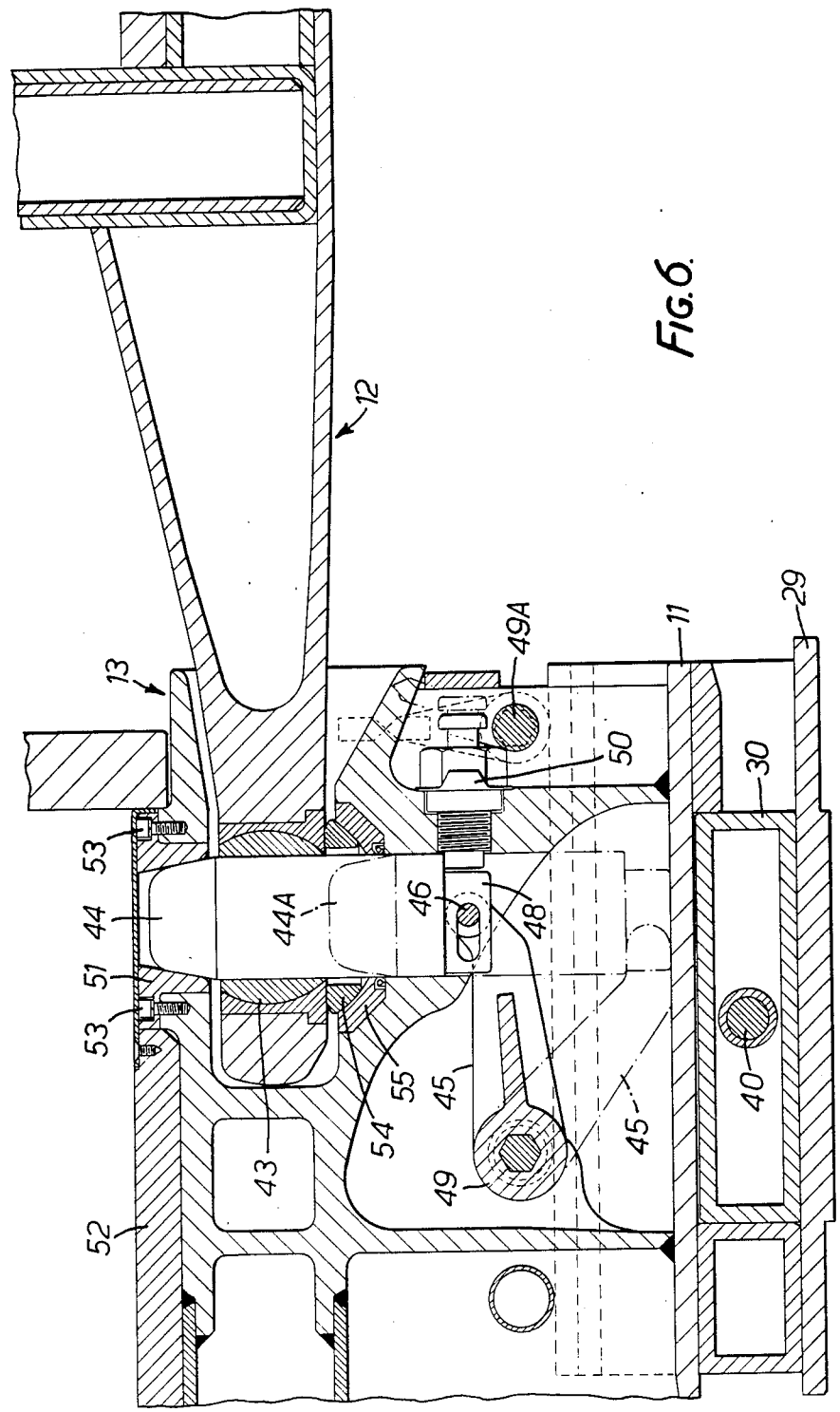
FIG. 6 is a part sectional view showing the connection of one semi-trailer to another, the connection of the semi-trailer to a bogie being omitted.

Referring now to FIG. 6 there is shown the arrangement whereby the coupling tongue 12 of one semi-trailer can be coupled to a complementary socket 13 in the body bolster 11 at the rear of the semi-trailer. The tongue 12 is formed at its end with an aperture in which an apertured ball joint 43 is mounted. A pin 44 engages in the aperture in the ball joint to hold the tongue 12 in the socket 13, the ball joint permitting limited movmement of the tongue about the pin in any direction. In order to release the coupling the pin 44 can be lowered from the position shown in full lines in FIG. 6 to the position 44A shown in broken lines by means of a bracket 45 engaging a pin 46 movable in a slot 47 in a block 48 attached at the lower end of the pin 44. The bracket 45 is movable by an arm 49 similar to the arm 41. A spring loaded catch 50 is provided to hold the pin 44 in its coupling position and is deflectable out of the path of movement of the pin 44 by a rod 49A also similar to the rod 41, so that the bracket 45 can be moved downwards.

The upper end of the pin 44 is tapered and is received in a centring ring 51 mounted in the floor 52 of the semi-trailer. The centring ring is held in place by bolts 53 and can be removed to give access to the pin 44 for repair or replacement.

In order to transmit the load from the coupling 12 to the body bolster 11 and thence to the bogie 9, the tongue rests on a thrust washer 54 which has a part spherical surface resting on a part-spherical bearing member 55.

In order to assemble a train of semi-trailers 8 and bogies 9, and referring now to FIG. 2, a bogie 9 is placed at the end of the loading pad 60. On flat track, the bogies which are of short wheel base and fitted with roller bearings, can easily be moved by one man. Each bogie is fitted with a parking brake (not shown but conventional) capable of holding a fully loaded rail unit on a 1:40 incline. The first semi-trailer 8 is backed on the bogie 9 in the direction of arrow A. A simple stop on the semi-trailer and tyre guides on the loading pad can be provided to ensure quick alignment. The road suspension is raised and the semi-trailer 8 drops and locks onto the bogie 9 to form the first rail transport unit 61 (FIG. 2(b)).

The landing legs 14, with shoes at rail centres are dropped and the tractor unit 2 withdrawn (FIG. 2(c)). The next semi-trailer 8B, and subsequent semi-trailers are fitted in the same way except that the tongue 12 and socket 13 connection between units is also made, the connection having been shown in more detail in FIG. 6. The road suspension and landing legs can be mechanical or air operated to make the necessary vertical alignment adjustments. When the last semi-trailer 8N, has been fitted a bogie 9 is offered up in the normal way, but is fitted under the front bolster 10 (FIG. 2(d)). This bolster has the same design of aperture for receiving the retaining means of the bogie 9 as that fitted at the rear of the semi-trailer, that is to say it is provided with a shoe 38 and retaining pin 40. A locomotive 7 is coupled to one end of the completed train.

Half the load of each of a pair of adjacent semi-trailers is transmitted via the tongue and socket coupling and the rear body bolster 11 to the center pivot of the supporting bogie 9. The complete train is thus not sensitive to direction and has the same performance forward or reverse. The total load on each bogie (other than the two end bogies) is exactly equivalent to one semi-trailer. A 31 tonne semi-trailer plus one fully equipped bogie will be less than 40 tonne i.e. less than the maximum permissible 20 tonne/axle rail limit.

A rail terminal for the assembly of a train requires a length of reasonably flat track with the ground made up to rail level for approximately two semi-trailer lengths as a loading pad. The assembly operation will probably require two operators, a driver and a ground man. The locomotive can be used to index completed units from the loading pad, or alternatively, on a flat the train may remain stationary as the tractor units bring further semi-trailers to the growing end of the train. The bogies are retained at the terminal when not being used. They need never go to a rail shop for maintenance. All maintenance and inspection can be carried out at the terminal in a small bogie maintenance shed.

The exact number of semi-trailers and bogies need not be matched. A particular operation may require a greater utilization of the semi-trailers on the road. Alternatively, under utilized bogies can be exchanged between terminals, or used again immediately with another batch of waiting semi-trailers.

It will be appreciated that many variations of the bogies and semi-trailers described may be made.

While the bogies have been described as being of the H-frame type, the invention is equally applicable to so-called "three-piece" bogies. In each case the mounting and pocket have complementary surfaces which are preferably spherical or part-spherical, although as indicated above disc-shaped mounting members may be employed.

Figure 4A:
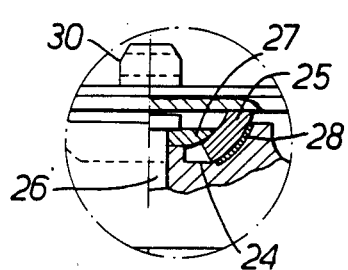
FIG. 4A is an enlarged detail view of the encircled portion illustrated in FIG. 4.
Figure 4B:
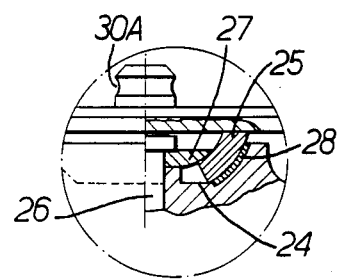
FIG. 4B is an enlarged detail view of a modification of the encircled portion of FIG. 4.

Thus the attachment means, instead of an apertured block may comprise a substantially vertical spigot upstanding from the plate 29. The spigot, may be formed with an aperture or as shown in FIG. 4A with a circumferential groove to receive a retaining pin. While this arrangement may be cheaper than the attachment means shown in FIGS. 3 to 5, it is less easy to make the attachment of the semi-trailer to the bogie.

While FIG. 2 shows the last bogie fitted to the front bolster of a semi-trailer, it may be undesirable to adapt the front bolster to receive the retaining block 30 of the bogie due to the expense involved or the increase in weight entailed thereby. In this case, it may be desirable to provide each train with an adapter bogie similar to the bogie or adapter vehicle 6 of FIG. 1.

If, however, it is desired to haul the train from the other end then it is desirable to use a coupling member for reverse running. Such a coupling member 70 is shown in FIG. 7 and has a tongue 71 for coupling in the socket 13 of a semi-trailer 8. The member essentially comprises a triangular frame 72 terminating in cups 73 for receiving the buffers 74 of a locomotive 7. The coupling member also has a hook 75 for coupling to a hook and link coupling 76 of the locomotive. FIG. 7 also shows the bogie 9 and the hosepipe connection 33 of the braking system for connection to a terminal 77 on the locomotive.

While FIG. 2 shows a train made up from road semi-trailers and bogies, it will be appreciated that for a purely rail mode of operation a train may be made up from rail semi-trailers and such a train is shown in FIG. 8.

Referring now to FIG. 8, there is shown a number of carrying units 80 and 81 assembled to form a train. Each unit has at each end a transverse box section or body bolster 82. One body bolster has a coupling tongue 83 projecting from it while the other body bolster has a complementary socket.

The body bolster with the complementary socket is mounted on a bogie 9 in the manner described above. The bogie has air brake hoses 84 which are connected to the ends of rail brake pipes fitted in the flat bed units.

As shown in the drawing, the carrying units comprise flat bed units 81 which may be used to carry containers 85 which can be off loaded at a depot on to conventional container lorries, or semi-trailers 86 provided with road wheels as well as other articles. In additon, the carrying units may comprise tank units 80 or other rail units.

Although for the purpose of illustration the drawing shows different types of carrying units connected up to form a train, it will be appreciated that, in general, it will be more convenient to form a train from a plurality of the same type of unit.

Furthermore, it will also be appreciated that in order to facilitate coupling and uncoupling of the carrying units, each unit is preferably provided with conventional retractable landing legs 14 as indicated in broken lines.

I claim:

1. A stand-alone railroad bogie adapted to be removably coupled to an over-the-road travel semi-trailer to convert the semi-trailer to rail mode travel, the bogie comprising
   two axles,
   bogie wheels supporting said axles,
   a frame supporting said axles,
   a central bogie bolster arranged between said axles, a pocket in said bogie bolster, and a mounting member held in said pocket so as to permit limited bearing movement of the mounting member relative to said pocket,
   a substantially planar covering surface fixed to said mounting member for preventing ingress of dirt and moisture into said pocket from above, and
   a quick-release coupling part mounted on said covering surface for engagement with a cooperating quick-release coupling part on a semi trailer whereby a semi-trailer is removably couplable to the bogie without removing the mounting member from the pocket.

2. The system of claim 1, said bogie pocket having a part-spherical surface formed therein, said mounting member having a complementary part-spherical surface, said bogie pocket further having a mounting pin projecting from said surface of said pocket and through an aperture in said mounting member, said bogie further including a mounting disc cooperating with said mounting pin to hold said mounting member in said pocket.

3. The bogie of claim 2, said mounting disc positioned surrounding said mounting pin and between said mounting member and said planar covering surface.

4. A road and rail transport system comprising
   a plurality of semi-trailers, each semi-trailer comprising a body member, raod wheels fixed to said body member's trailing end for supporting said semi-trailer during over-the-road travel, connecting means fixed to said body member's leading end for connecting said semi-trailer to a tractor unit, a body bolster fixed to each end of said body member,
   body member coupling means connected to each body bolster that cooperates to permit a leading end of a first semi-trailer to be releasably coupled directly to a trailing end of a second semi-trailer for allowing movement of one semi-trailer relative to the other about a first substantially vertical axis and for allowing part of the load of each said semi-trailer to be transmitted along said vertical axis,
   a plurality of bogies, each bogie comprising two axles, bogie wheels mounted on said axles, a frame supporting said axles, a central bogie bolster arranged between said axles, a pocket formed in said bogie bolster, a mounting member mounted in said pocket for limited bearing movement relative to said pocket, and a substantially planar covering surface fixed to said mounting member to prevent ingress of dirt and moisture in said pocket from above, and
   quick release bogie/semi-trailer coupling means having a first part mounted on the covering surface of said bogie's mounting member and a second part mounted on a semi-trailer's trailing end body bolster, said bogie/semi-trailer coupling means permitting said semi-trailer to pivot relative to said bogie about a second substantially vertical axis passing through the center of said pocket and mounting member, said second vertical axis substantially coinciding with said first vertical axis,
   said bogie/semi-trailer coupling means permitting trains of bogies and semi-trailers to be readily assembled where said bogies are always used together with said semi-trailers in said system's rail mode but where said semi-trailers are demountable from said bogies and used independent therefrom in said system's road mode.

5. The system of claim 4, each semi-trailer comprising brake pipe means and each bogie comprising brake means, said bogies' brake means being serially interconnectable with each other through said semi-trailers' brake pipe means when said bogies and semi-trailers are assembled to form a train, and said brake means being operable through control means on a locomotive arranged to drive the train.

6. The system of claim 4 or 5, said bogie/semi-trailer coupling means comprising
   a member upstanding from said bogie's mounting member and formed with structure defining one of an aperture and a groove, and
   a locking member adapted to be received in one of said aperture and groove.

7. The system of claim 6, said upstanding member comprising
   an apertured block.

8. The system of claim 6, said upstanding member comprising
   a substantially vertical spigot formed with structure defining one of an aperture and a circumferential groove to receive said locking member.

9. The system of claim 4, the leading end of a second semi-trailer being pivotably connected to the trailing end of a first semi-trailer by said body member coupling means when the trailing end of a said first semi-trailer is connected to a bogie by said bogie/semi-trailer coupling means so that part of the load of said second semi-trailer is transmitted to that bogie connected to said first semi-trailer.

10. The system of claim 4, each semi-trailer comprising
    means for lifting said road wheels out of contact with the ground when said semi-trailer is connected to and supported on a bogie.

11. The system of claim 4 or 9 comprising
    a plurality of rail semi-trailers in the form of flat bed units, said units being devoid of road wheels.

12. The system of claim 9, said body member coupling means comprising
    a tongue at one end of said semi-trailer and a slot at the other end of said semi-trailer, the tongue of a second semi-trailer being adapted for mating engagement with the slot of a first semi-trailer.

13. The system of claim 12, said body member coupling means comprising
    a pin connected to an arm for up and down movement to permit coupling and uncoupling of said first and second semi-trailers, said pin being mounted so as to be removable in an upward direction.

14. The system of claim 4 comprising
an adapter bogie for establishing a connection between the leading semi-trailer of a train of semi-trailers connected to bogies, and a locomotive for that train.

15. The system of claim 4 comprising
a coupling member for reverse running, said reverse running coupling member comprising a substantially triangular member in plan view, a connector at the apex of said triangular member for connecting said reverse running coupling member to a semi-trailer, cups at the base of said triangular member for receiving a locomotive's buffers, and locomotive coupling means for coupling said triangular member to a locomotive.

16. The system of claim 4, said bogie pocket having a part-spherical surface formed therein, said mounting member having a complementary part-spherical surface, said bogie pocket further having a mounting pin projecting from said surface of said pocket and through an aperture in said mounting member, said bogie further including a mounting disc cooperating with said mounting pin to hold said mounting member in said pocket.

17. The system of claim 16, said mounting disc positioned surrounding said mounting pin and between said mounting member and said planar covering surface.

* * * * *

UNITED STATES PATENT AND TRADEMARK OFFICE
CERTIFICATE OF CORRECTION

PATENT NO. : 4,773,336
DATED : September 27, 1988
INVENTOR(S) : Robert M. Ord

It is certified that error appears in the above-identified patent and that said Letters Patent is hereby corrected as shown below:

>   The inventor's name on the face of the patent as issued has been misspelled. The name should be corrected to read as follows:
>
>   --Robert M. Ord--

Signed and Sealed this

Second Day of May, 1989

Attest:

DONALD J. QUIGG

Attesting Officer

Commissioner of Patents and Trademarks

Notice of Adverse Decision in Interference

In Interference No. 102,155, involving Patent No. 4,773,336, R. M. Ord, RAILROAD BOGIE FOR REMOVABLY SUPPORTING COUPLED SEMI-TRAILERS, final judgment adverse to the patentee was rendered Jan. 24, 1990, as to claims 1-4 and 9-17.

(*Official Gazette May 8, 1990*)